(12) United States Patent
Tseng

(10) Patent No.: US 9,075,210 B2
(45) Date of Patent: Jul. 7, 2015

(54) OPTICAL TRANSMISSION CONNECTING ASSEMBLY

(71) Applicant: Kuo-Fong Tseng, New Taipei (TW)

(72) Inventor: Kuo-Fong Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 227 days.

(21) Appl. No.: 13/655,561

(22) Filed: Oct. 19, 2012

(65) Prior Publication Data

US 2013/0315543 A1 Nov. 28, 2013

(30) Foreign Application Priority Data

May 23, 2012 (TW) .............................. 101118270 A

(51) Int. Cl.
*G02B 6/36* (2006.01)
*G02B 6/43* (2006.01)
*G02B 6/42* (2006.01)

(52) U.S. Cl.
CPC . *G02B 6/43* (2013.01); *G02B 6/428* (2013.01); *G02B 6/4214* (2013.01)

(58) Field of Classification Search
CPC ........................................................ G02B 6/43
See application file for complete search history.

(56) References Cited

U.S. PATENT DOCUMENTS

| 6,105,096 | A | * | 8/2000 | Martinelli et al. | 710/306 |
| 8,036,502 | B2 | * | 10/2011 | Duricic et al. | 385/16 |
| 2006/0187798 | A1 | * | 8/2006 | Ozawa et al. | 369/112.09 |
| 2006/0263003 | A1 | * | 11/2006 | Asai et al. | 385/14 |
| 2009/0097803 | A1 | * | 4/2009 | Yeo | 385/89 |

* cited by examiner

*Primary Examiner* — Uyen Chau N Le
*Assistant Examiner* — Chad Smith
(74) *Attorney, Agent, or Firm* — Novak Druce Connolly Bove + Quigg LLP

(57) ABSTRACT

An optical-electrical conversion module includes a circuit board, a planar optical waveguide formed on the circuit board, two first lenses and two second lenses mounted above the planar optical waveguide, a base plate electrically connected to the circuit board, and an optical signal emitting member and an optical signal receiving member mounted on the base plate. The planar optical waveguide forms two inclined surfaces. The base plate is positioned above the second lenses. Optical signals are reflected by the inclined surface, and are transmitted to the optical signal receiving member. The optical signal receiving member converts the optical signals to electrical signals to transmit to the circuit board. Electrical signals of the circuit board are converted to optical signals via the optical signal emitting member, and then are transmitted to the planar optical waveguide. The present disclosure further provides an optical transmission connecting assembly using the optical-electrical conversion module.

8 Claims, 2 Drawing Sheets

OPTICAL TRANSMISSION CONNECTING ASSEMBLY

BACKGROUND

1. Technical Field

The present disclosure relates to optical-electrical conversion modules, particularly to an optical-electrical conversion module and an optical transmission connecting assembly using the optical-electrical conversion module.

2. Description of Related Art

Optical communication is popular due to its higher speed and larger capability. An optical-electrical conversion module may include a plurality of optical components (such as an optical signal emitting member or an optical signal receiving member) mounted on a circuit board. When assembling the optical-electrical conversion module, the optical components may be bonded on the circuit board by colloidal silver, and a plastic cover may be mounted on the circuit board by UV glue, for covering the optical components. An optical waveguide is inserted into the cover, for transmitting optical signals. Because the optical components are precisely designed of higher degree of complexity, thus an automatic assembling thereof may be difficult to be realized. Therefore, a manual assembling of the optical-electrical conversion module may be suitable. However, the manual assembling of the optical-electrical conversion module may increase the costs and decrease the assembling efficiency.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
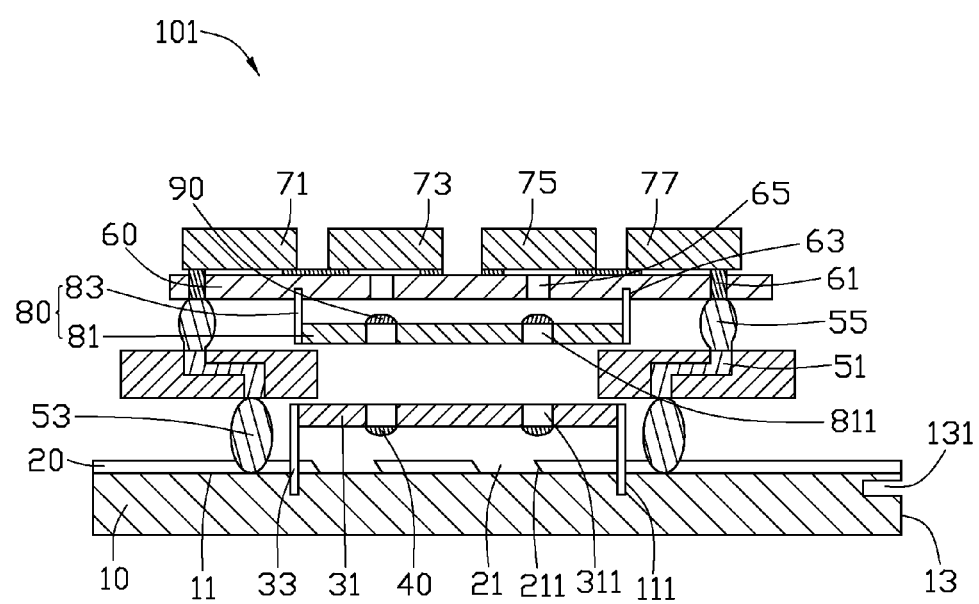
FIG. 1 is a sectional view of an embodiment of an optical-electrical conversion module.
Figure 2:
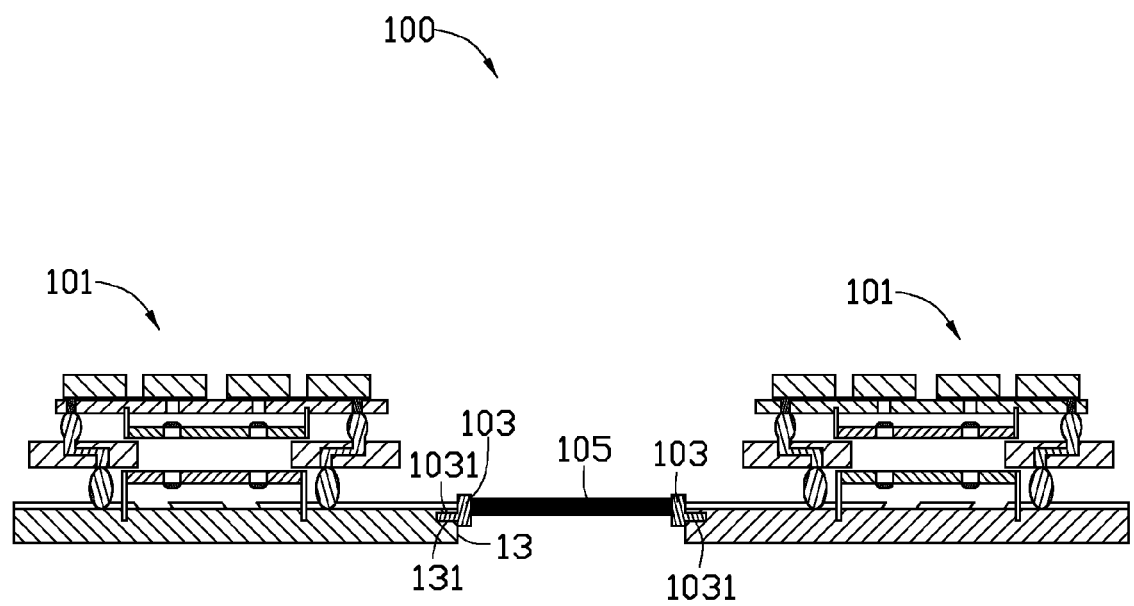
FIG. 2 is a sectional view of an embodiment of an optical transmission connecting assembly including a pair of the optical-electrical conversion module shown in FIG. 1.

FIGS. 1 and 2 show an embodiment of an optical transmission connecting assembly 100. The optical transmission connecting assembly 100 includes a pair of optical-electrical conversion modules 101, a pair of connecting members 103, and an optical waveguide 105. The optical waveguide 105 is connecting the pair of optical-electrical conversion modules 101 via the pair of connecting members 103. See FIG. 1, one of the optical-electrical conversion modules 101 is reversed 180 degrees relative to the other. The optical-electrical conversion module 101 is configured to convert optical signals to electrical signals or convert electrical signals to optical signals. The optical waveguide 105 is used to transmit optical signals between the pair of optical-electrical conversion modules 101. In the illustrated embodiment, the optical waveguide 105 is a foldable optical waveguide.

The optical-electrical conversion module 101 includes a circuit board 10, a planar optical waveguide 20, a first mounting member 30, at least two first lenses 40, at least two soldering plates 50, a base plate 60, a first driving member 71, an optical signal emitting member 73, an optical signal receiving member 75, a second driving member 77, a second mounting member 80, and at least two second lenses 90. The planar optical waveguide 20 is formed on the circuit board 10. The first mounting member 30 is detachably latched with the circuit board 10, and is located above the planar optical waveguide 20. The at least two first lenses 40 are mounted on the first mounting member 30, and are positioned above the planar optical waveguide 20, for receiving and transmitting optical signals from or to the planar optical waveguide 20. The two soldering plates 50 are soldered on the circuit board 10 adjacent to two opposite ends of the first mounting member 30 via a plurality of solder balls 53, and are located above the first mounting member 30. The soldering plates 50 are electrically connected to the circuit board 10.

The base plate 60 is mounted on and above the soldering plate 50. The two opposite ends of the base plate 60 are soldered with the corresponding soldering plate 50. In the illustrated embodiment, the base plate 60 is soldered on the soldering plate 50 via a plurality of solder balls 55, and is electrically connected to the soldering plate 50, to enable the base plate 60 to be electrically connected to the circuit board 10. The first driving member 71, the optical signal emitting member 73, the optical signal receiving member 75, and the second driving member 77 are mounted on a side of the base plate 60 away from the circuit board 10, and are electrically connected to the circuit board 10 via the soldering plate 50. The first driving member 71 controls the optical signal emitting member 73 to convert electrical signals from the circuit board 10 to optical signals. The second driving member 77 controls the optical signal receiving member 75 to convert the optical signals to electrical signals to send to the circuit board 10.

The second mounting member 80 is detachably latched with a side of the base plate 60 facing the circuit board 10, and is located above the first mounting member 30. The at least two second lenses 90 are mounted on the second mounting member 80, and are positioned at a side of the base plate 60 adjacent to the circuit board 10. The at least two second lenses 90 are aligned with the optical signal receiving member 75 and the optical signal emitting member 73. One of the at least two second lens 90 is aligned with the optical signal emitting member 73 and configured for receiving optical signals from the optical signal emitting member 73 and transmitting the optical signals to the corresponding one of the first lenses 40, and the other one of the at least two second lens 90 is aligned to the optical signal receiving member 75 and configured for receiving optical signals from the corresponding the other one of the first lenses 40 and transmitting the optical signals to the optical signal receiving member 75. The connecting member 103 detachably latches with the circuit board 10. An end of the optical waveguide 105 connects with the connecting member 103, and the optical waveguide 105 couples with the planar optical waveguide 20.

The circuit board 10 includes a first latching surface 11 towards the first mounting member 30, and a second latching surface 13 adjacent to the first latching surface 11 and towards the optical waveguide 105. The first latching surface 11 defines at least one first latching groove 111, for latching the first mounting member 30. The second latching surface 13 defines a locking groove 131, for latching the connecting member 103. In the illustrated embodiment, the number of the first latching groove 111 is two.

The planar optical waveguide 20 is positioned on the circuit board 10, and defines two openings 21. Each opening 21 includes an inclined surface 211 adjacent to the optical waveguide 105, and an included angle of the inclined surface 211 relative to a bottom surface of the opening 21 is about 45 degrees. In the illustrated embodiment, the planar optical waveguide 20 is coated on the circuit board 10 via a photoresist spin coater. The inclined surface 211 is manufactured by semiconductor lithography processing.

The first mounting member 30 includes a main body 31, and a pair of first latching portions 33 extending from two ends of the main body 31 towards the circuit board 10. The main body 31 defines two first through holes 311 above the corresponding inclined surfaces 211, respectively. The first latching portions 33 are latched on the first latching grooves 111 of the circuit board 11. In other embodiment, the number of the first latching portion 33 can be one, three or more, and when the number of the latching portion is one, the latching portion may be positioned at a substantially middle portion of the main body 31.

In the illustrated embodiment, there are two first lenses 40 mounted on corresponding first through holes 311, and are aligned with the corresponding inclined surface 211 of the planar optical waveguide 20. In other embodiment, the number of the first lens can be three, four, or more, and the number of the first through holes 311 may be three, four, or more, correspondingly.

The two soldering plates 50 are soldered at opposite ends of the first mounting member 30 via the solder balls 53, and are parallel to the circuit board 10. Each soldering plate 50 includes a metallic bonding pad 51 passing through the soldering plate 50. When the soldering plate 50 is soldered to the circuit board 10, the solder balls 53 are soldered on the metallic bonding pad 51, for electrically connecting the soldering plate 50 and the circuit board 10.

In the illustrated embodiment, the base plate 60 is a silicon plate, and located above the first mounting member 30. The base plate 60 includes two metallic bonding pads 61 passing through two opposite ends of the base plate 60. The base plate 60 is soldered to the soldering plate 50 via soldering the solder balls 55 with the metallic bonding pads 51 and the metallic bonding pads 61, for electrically connecting the base plate 60 with the circuit board 10 via the soldering plate 50. The base plate 60 defines two second latching grooves 63, and two second through holes 65 located between the two second latching grooves 63. The second latching grooves 63 are configured for latching with the second mounting member 80. The second through holes 65 are aligned with the corresponding inclined surface 211 of the planar optical waveguide 20. In other embodiments, the base plate 60 may be directly soldered to the circuit board 10.

The first driving member 71, the optical signal emitting member 73, the optical signal receiving member 75, and the second driving member 77 are mounted on a side of the base plate 60 adjacent to the circuit board 10, and the optical signal emitting member 73 and the optical signal receiving member 75 are aligned with one corresponding second through hole 65, respectively. In the illustrated embodiment, the first driving member 71, the optical signal emitting member 73, the optical signal receiving member 75, and the second driving member 77 are mounted on the base plate 60 via flip chip processing and eutectic bonding. The first driving member 71 is electrically connected to the optical signal emitting member 73, and the second driving member 77 is electrically connected to the optical signal receiving member 75. An end of the first driving member 71 and an end of second driving member 77 are respectively mounted on one corresponding metallic bonding pad 61, for electrically connecting with the circuit board 10. The first driving member 71 controls the optical signal emitting member 73 to receive electrical signals, and convert the electrical signals to optical signals. The second driving member 77 controls the optical signal receiving member 75 to receive optical signals, and convert the optical signals to electrical signals. In other embodiment, the first driving member 71, the optical signal emitting member 73, the optical signal receiving member 75, and the second driving member 77 may be pasted or bonded on the base plate 60 via colloidal silver.

The second mounting member 80 is similar to the first mounting member 30, and includes a base body 81, and a pair of second latching portions 83 extending from two ends of the base body 81 towards the base plate 60. The base body 81 defines two third through holes 811. The second latching portions 83 are latched in the second latching grooves 63 of the base plate 60, and the third through holes 811 are aligned with the corresponding second through holes 65 and the corresponding first through holes 311. In other embodiment, the number of the latching portion 83 may be one, three, four or more. In the illustrated embodiment, there are two second lenses 90 mounted on the third through holes 811, and coupling with the first lenses 40. In other embodiments, the number of the second lenses 90 can be three, four, or more, and the number of the third through holes 811 may be three, four, or more, correspondingly.

A positioning portion 1031 protrudes from the connecting member 103, and is latched in the locking groove 131 of the circuit board 10. The optical waveguide 105 is connected with the connecting member 103, and coupled with the planar optical waveguide 20.

In assembly, the planar optical waveguide 20 is coated on the circuit board 10. The first latching portions 33 of the first mounting member 30 are latched with the first latching grooves 111 of the circuit board 10. The first lenses 40 are mounted on the first mounting member 30, and aligned with the first through holes 311. The soldering plates 50 are soldered on the circuit board 10 via the solder balls 53, and is located at two opposite sides of the first mounting member 30. The first driving member 71, the optical signal emitting member 73, the optical signal receiving member 75, and the second driving member 77 are mounted on the base plate 60 one by one. The second latching portions 83 of the second mounting member 80 are latched with the second latching groove 63 of the base plate 60. The second lenses 90 are mounted on the second mounting member 80, and aligned with the first lenses 40. The base plate 60 is soldered on the soldering plates 50 via the solder balls 55. The positioning portions 1031 of connecting member 103 is latched with the locking groove 131 of the circuit board 10. The optical waveguide 105 is inserted into the connecting member 103, and coupling with the planar optical waveguide 20.

In use, electrical signals from the circuit board 10 are transmitted to the optical signal emitting member 73 by through the soldering plates 50 and the base plate 60. The optical signal emitting member 73 converts the electrical signals to optical signals, and the optical signals are transmitted to the inclined surface 211 of the planar optical waveguide 20 via the corresponding second through hole 65, the corresponding second lens 90, and the corresponding first lens 40. The inclined surface 211 then reflects the optical signals to the planar optical waveguide 20, and the optical signals are transmitted parallel to the circuit board 10, and then transmitted to the optical waveguide 105. After the optical signals are transmitted to the planar optical waveguide 20 of the other one of the optical-electrical conversion modules 101 from the optical waveguide 105, the optical signals are reflected by the inclined surface 211, and are transmitted to the corresponding first lens 40 along a direction perpendicular to the circuit board 10. The optical signals are further transmitted to the optical signal receiving member 75 via the corresponding second lens 90 and the corresponding second through hole 65. The optical signal receiving member 75 receives and converts the optical signals to electrical signals, and the electrical signals are transmitted to the circuit board 10 via the soldering plates 50. The electrical signals are then transmitted to the optical signal emitting member 73 at the same one of the optical-electrical conversion modules 101 and converted to optical signals, and due to the reversed arrangement of the optical-electrical conversion modules 101, the optical signals can be finally transmitted to the optical signal receiving member 75 at the other one of the optical-electrical conversion modules 101, thereby forming working loop between the pair of optical-electrical conversion modules 101.

In other embodiment, the positioning portions 1031 can be positioned on the optical waveguide 105, and then the connecting members 103 can be omitted. In other words, the optical waveguide 105 may be directly mounted on the circuit board 10. The second mounting member 80 may be latched on the circuit board 10. The first mounting member 30 and the second mounting member 80 can be replaced by other structures, while ensuring that the first lenses 40 and the second lenses 90 are located between the circuit board 10 and the base plate 60. The optical signal receiving member 75 and the optical signal emitting member 73 may be mounted on a side of the base plate 60 adjacent to the circuit board 10.

It is believed that the present embodiments and their advantages will be understood from the foregoing description, and it will be apparent that various changes may be made thereto without departing from the spirit and scope of the embodiments or sacrificing all of its material advantages.

What is claimed is:

1. An optical transmission connecting assembly, comprising:
    a pair of optical-electrical conversion modules with one of the optical-electrical conversion modules being reversed 180 degrees relative to other one of the optical-electrical conversion modules, each optical-electrical conversion module comprising:
    a circuit board;
    a planar optical waveguide formed on the circuit board, and defining at least two inclined surfaces, for reflecting optical signals;
    a base plate electrically connected to the circuit board;
    a first mounting member detachably latched with the circuit board, and located between the circuit board and the base plate;
    at least two first lenses mounted on the first mounting member, and aligned with the at least two inclined surfaces;
    a second mounting member detachably latched with the circuit board, and located between the first mounting member and the base plate;
    at least two second lenses mounted on the second mounting member, and positioned between the at least two first lenses and the base plate, each of the at least two second lenses aligned with one corresponding inclined surface and one corresponding first lens;
    an optical signal emitting member mounted on the base plate, and aligned with one corresponding second lens, for converting electrical signals to optical signals; and
    an optical signal receiving member mounted on the base plate, and aligned with another one corresponding second lens, for converting optical signals to electrical signals; and
    an optical waveguide connecting the pair of optical-electrical conversion modules, and coupling with the planar optical waveguides of the pair of optical-electrical conversion modules, wherein the optical waveguide transmits optical signals to a corresponding one of the at least two inclined surfaces of the corresponding planar optical waveguide, and the corresponding one of the at least two inclined surfaces reflects the optical signals to a corresponding one of the at least two first lenses, the optical signals are further transmitted to the corresponding optical signal receiving member via the corresponding one of the at least two first lenses and the corresponding one of the at least two second lenses, the corresponding optical signal receiving member converts the optical signals to electrical signals to the corresponding circuit board, the corresponding optical signal emitting member converts the electrical signals to optical signals, and the optical signals are transmitted to the corresponding other one of the at least two inclined surfaces via the corresponding other one of the at least two second lenses and the corresponding other one of the at least two first lenses, and then are reflected by the corresponding other one of the at least two inclined surfaces to the planar optical waveguide for transmitting optical signals parallel to the circuit board and return to the optical waveguide, a surface of the circuit board adjacent to the first mounting member defines at least one first latching groove, the first mounting member comprises a main body and at least one first latching portion extending from the main body to the circuit board, and the at least one first latching portion latches in the at least one first latching groove.

2. The optical transmission connecting assembly of claim 1, wherein the optical transmission connecting assembly further comprises a pair of connecting member, a side of the circuit board adjacent to the optical waveguide defines a locking groove, each connecting member comprises a positioning portion, the positioning portion of each connecting member is latched with the locking groove of one corresponding optical-electrical conversion module, two opposite ends of the optical waveguide are respectively connected to the connecting members.

3. The optical transmission connecting assembly of claim 1, wherein the optical-electrical conversion module further comprises two soldering plates, each soldering plate comprises a metallic bonding pad, the base plate comprises two metallic bonding pads at two opposite ends thereof, the metallic bonding pad of each soldering plate is soldered to one corresponding metallic bonding pad of the base plate via a plurality of solder balls, and the metallic bonding pads of the soldering plates are soldered to the circuit board.

4. The optical transmission connecting assembly of claim 3, wherein the optical-electrical conversion module further comprises a first driving member and a second driving member mounted on the base plate, the first driving member is electrically connected to the optical signal emitting member, and controlling the optical signal emitting member to convert electrical signals to optical signals, the second driving member is electrically connected to the optical signal receiving member, and controlling the optical signal receiving member to convert the optical signals to electrical signals.

5. The optical transmission connecting assembly of claim 1, wherein the main body of the first mounting member defines at least two first through holes, the at least two first lenses are mounted on the at least two first through holes.

6. The optical transmission connecting assembly of claim 5, wherein a surface of the base plate adjacent to the circuit board defines at least one second latching groove, the second mounting member comprises a base body and at least one second latching portion extending from the base body toward the base plate, the at least one second latching portion latches in the at least one second latching groove.

7. The optical transmission connecting assembly of claim 1, wherein the base plate defines at least two second through holes aligned with the corresponding optical signal emitting member and the corresponding optical signal receiving member, respectively.

8. The optical transmission connecting assembly of claim 6, wherein the second mounting member defines at least two third through holes, the at least two second lenses are mounted in the at least two third through holes.

* * * * *